United States Patent [19]

Krevenas et al.

[11] 4,045,393

[45] Aug. 30, 1977

[54] RUST RESISTANT LATEX PAINT PRIMER FOR METAL SURFACES

[75] Inventors: Paul Krevenas, Philadelphia, Pa.; David Graeme Milne, Miami, Fla.

[73] Assignee: N L Industries, Inc., New York, N.Y.

[21] Appl. No.: 644,312

[22] Filed: Dec. 24, 1975

Related U.S. Application Data

[63] Continuation-in-part of Ser. No. 540,873, Jan. 14, 1975, abandoned.

[51] Int. Cl.$^2$ .............................................. C08L 91/00
[52] U.S. Cl. ......................... 260/23 R; 260/29.6 H; 260/29.6 ME; 427/385 R; 428/458
[58] Field of Search ............... 260/23 AR, 29.6 MM, 260/29.6 BM, 29.6 ME, 29.6 H, 23 R; 106/14.5

[56] References Cited

U.S. PATENT DOCUMENTS

| 2,889,236 | 6/1959 | Hahn | 260/23 AR |
| 3,234,039 | 2/1966 | Lalk et al. | 260/23 AR |
| 3,332,899 | 7/1967 | Cummings et al. | 260/23 AR |
| 3,547,847 | 12/1970 | Levine et al. | 260/23 AR |
| 3,917,864 | 11/1975 | White | 106/14.5 |

*Primary Examiner*—Melvyn I. Marquis
*Assistant Examiner*—W. E. Parker

[57] ABSTRACT

A latex paint composition has been prepared which contains in addition to its paint composition from 5 to 15% of a basic zinc phosphite composition and from 2 to 10% of a natural drying oil. This new latex paint composition is useful for preventing flash rust stains when used on metal surfaces.

6 Claims, No Drawings

RUST RESISTANT LATEX PAINT PRIMER FOR METAL SURFACES

This application is a continuation-in-part of our application Ser. No. 540,873 filed Jan. 14, 1975 and now abandoned.

BACKGROUND OF THE INVENTION

For many years in the past, paint primers for metal surfaces were prepared primarily from oil base paints. Within the past 10 or 15 years attempts have been made to prepare water base or latex paints for metal surface primers.

When these latex paints were used on rusty surfaces, rust spots would appear through the primer coat. Several anti-corrosion latex paints were developed to overcome the formation of rust spots which are called "flash-rusting", i.e., the rust spots would appear immediately on the paint surface.

Zinc oxide, zinc phosphate, zinc molybdate, zinc chromate, passive iron phosphate, iron oxide and basic lead-silica-chromate, among others, have been used as anti-corrosion agents with limited success.

None of these paint systems are able to prevent the formation of flash-rusting however, when iron or steel surfaces have been cleaned by blasting with iron grit or iron shot and the latex paint is used as a primer on such surfaces. None of the known anti-flash-rusting latex paints prevent rust spots from forming on the surface of the paint primer when used on such metal surfaces.

It is desirable, therefore, to prepare a latex paint primer which prevents flash-rusting when used on a metal surface which has been cleaned by iron grit or shot-blasting.

SUMMARY OF THE INVENTION

A new latex paint composition has been prepared. The latex paint composition contains in addition to its composition from 5 to 15% of a basic zinc phosphite composition and from 5 to 10% of a natural drying oil.

The latex paint composition of the instant invention is prepared in the following manner. A latex paint thickener is dissolved in water and a glycol, preferably ethylene or propylene glycol, and to this mixture is added an alkalizing agent, such as an amine to adjust the pH of the mixture to at least 9.5. To this mixture is added an oil-in-water emulsifier and a wetting agent. A natural drying oil is then added to the mixture. Paint pigments, if desired, are then added along with the basic zinc phosphite and then the entire mixture is ground to the desired fineness.

After grinding the latex vehicle is then added along with a coalescent agent and the entire mixture is again treated with an amine to adjust the pH to at least 9.5. A metallic salt drier is then added to the mixture and the latex paint system is completed after adjusting the viscosity by adding water to obtain a brushable or sprayable consistency.

DESCRIPTION OF THE PREFERRED EMBODIMENTS

In preparing the latex paint composition of the instant invention, for example 100 gallons, it is preferred to add 1 to 2 pounds of ethylene glycol. Substantially, any well-known thickener for latex paints may be employed. Among those which are particularly useful are methyl cellulose, hydroxyethyl cellulose and water soluble bentones.

This mixture is then treated with an alkalizer, for example an amine, to raise the pH to 9.5–10.5. 10.5.

An oil-in-water emulsifier and a wetting agent are then added. Many emulsifiers are wetting agents may be added. The emulsifier must be, however, an oil-in-water emulsifier. Nonionic emulsifiers such as polyethylene oxide octyl or nonyl phenols are particularly effective. Two commercially available products are Triton X100, and Triton CF10, made by Rohm & Haas, are particularly effective. Triton X100 is an alkylaryl polyether alcohol while Triton CF10 is an alkylaryl polyether. Typical wetting agents include Triton GR-7 and Tamol 850 (made by Rohm and Haas) and potassium tripolyphosphate. Triton GR-7 is a 25% solution of dioctyl sodium sulfosuccinate and Tomol 850 is a 30% solution of a sodium salt of polymeric carboxylic acid. The aounts of wetting agents and emulsifiers added may vary from 0.1 to 1.0% by weight of each agent in the paint composition.

The natural drying oil is then added to the mixture in amounts from 5 to 10%, along with 10 to 50% of pigment and from 5 to 15% of the basic zinc phosphite, all of the percentages expressed on a weight basis. The natural drying oils which may be employed are those that dry by oxidation at ambient temperatures. Such oils include, among others, tung, linseed, safflower, soya bean, peanut and tall oil.

The basic zinc phosphite composition employed in the instant invention as one of the ingredients in a latex paint to prevent flash rusting is a composition which is represented by the formula $xZnO, ZnHPO_3$ wherein $x$ is a number from $\frac{1}{2}$ to 10.

This composition is prepared by admixing zinc oxide and phosphoric acid in the presence of water. This composition and its method of preparation is more fully described in co-pending U.S. patent application Ser. No. 385,850, filed Aug. 6, 1973 now U.S. Pat. No. 3,917,804, issued Nov. 4, 1975 and it is assigned to the same Assignee as that of the instant application.

The mixture is then ground with high shear to obtain a desirable fineness. The latex emulsion usually containing from 45 to 60% solids is then added along with the coalescent agent. The amount of latex emulsion used is 20 to 30%, and the amount of coalescent agent employed is from 0.5 to 2% by weight. After these agents are added the mixture is treated with an alkalizing agent to adjust the pH to at least 9.5. A metallic salt drier is then added along with water to adjust the viscosity to the desired thickness.

In order to describe more fully the instant invention, the following examples are presented:

EXAMPLE 1

In this example the following latex paint was prepared:

1.5 pounds of hydroxyethyl cellulose, having a m.w. of 15,000, were mixed with 14.5 pounds of ethylene glycol and 100 pounds of water. To this mixture were added sufficient amount of triethylamine to adjust the pH to 10.0.

3.6 pounds of an oil-in-water emulsifier, Triton X-100, Rohm and Haas, and 3.6 pounds of another emulsifier, Triton CF-10, Rohm and Haas, were added along with 3.6 pounds of a wetting agent, Tamol 850, Rohm and Haas, and 3.6 pounds of potassium tripolyphosphate.

72 pounds of tung oil were then added along with 144 pounds of anatase titanium dioxide pigment, 36 pounds of red iron oxide pigment, and 115 pounds of magnesium silicate.

115 pounds of tri-basic phosphite 3 $ZnO.ZnHOP_3$, Nalzin SC-1 (zinc content 61%, spec. grav. 4.06) sold by NL Industries, Inc., were also added along with 70 pounds of water, and the entire mixture was then thoroughly ground on a high speed disperser to produce a fine textured paste.

After grinding 7.5 pounds of a coalescent agent, Texanol, $(CH_3)_2CHCO_2CH_2C(CH_3)_2CHOHCH(CH_3)_2$, prepared and sold by Eastman Chemical Co., were added along with 290 pounds of an acrylic emulsion containing 46% solids prepared and sold by Rohm and Haas under the trade name Rhoplex MV-9. The pH of the mixture was again adjusted to 10.0 by adding the amine. One pound of a zirconium naphthanate drier and 1 pound of cobalt naphthanate drier were also added. 144 pounds of water were then added to adjust the viscosity of the latex paint to a sprayable consistency.

When this latex paint primer containing the basic zinc phosphite and the drying oil were sprayed onto a freshly iron grit blasted steel surface, no flash rust spots appeared on the paint film.

For comparative purposes the same latex paint primer was prepared except that it contained no basic zinc phosphite. When this comparative latex paint primer was used on the freshly iron grit blasted steel surface, many flash rust spots appeared on the paint film.

These flash rust spots also appeared on the paint surface when other known anti-rust agents were used, such as zinc phosphate, zinc molybdate, passive iron phosphate, basic lead silicachromate, and the like, even though the drying oil was also used.

EXAMPLES 2-4

In these examples the latex paint of Example 1 was repeated except that the tung oil was replaced by linseed, soya bean and tall oils, respectively. Since they all contained the combination of a drying oil and a basic zinc phosphite composition, no flash rusting was observed when the paints were used to coat an iron grit blasted steel surface.

EXAMPLES 5-6

In these examples the latex paint of Example 1 was repeated except that latex emulsions other than the acrylic emulsion used in Example 1 were employed. In Example 5 a styrene-acrylic copolymer was used, while in Example 6 a polyvinyl acetate was employed. The styrene-acrylic copolymer contained 45% solids and was prepared and sold under the trade name Resyn 78-3497 by the National Starch Chemical Company. The polyvinyl acetate contained 55% solids and was prepared and sold as an emulsion under the trade name Polyco 2370 by the Borden Chemical Company. Again, no flash rusting appeared in the paint film when used on an iron grit blasted steel surface.

EXAMPLES 7-8

In these examples the latex emulsions used in Examples 3 and 6 were employed except that no drying oils were used.

When these paints were applied to the same steel surface, flash rusting was obtained even though the paints contained the basic zinc phosphite composition.

From the foregoing description and by the examples presented, it has clearly been shown that a latex paint, containing in addition to its composition, a basic zinc phosphite and a natural drying oil will produce a paint primer which will prevent flash rusting when the primer is used on a freshly iron grit or shot blasted surface of iron or steel. No other latex paint system will prevent this flash rusting.

While this invention has been described and illustrated by the examples shown, it is not intended to be strictly limited thereto, and other variations and modifications may be employed within the scope of the following claims.

We claim:

1. In a latex paint primer containing a polyacrylic, polystyrene-acrylic or polyvinyl acetate latex emulsion, said polymeric latex emulsion containing from 45 to 60% solids, the amount of said latex emulsion employed in said latex paint being from 20 to 30%, the improvement comprising having present in said latex paint primer from 5 to 10% of a natural drying oil selected from the group consisting of tung, linseed, safflower, soya bean, peanut and tall oil and from 5 to 15% a basic zinc phosphite having the formula $xZnO.ZnHPO_3$ where $x$ is a number from ½ to 10, thereby forming a paint primer which when used on a metal surface prevents flash rusting, all of the percentages expressed on a weight basis.

2. Composition according to claim 1 in which the natural drying oil is tung oil.

3. Composition according to claim 1 in which the natural drying oil is linseed oil.

4. Composition according to claim 1 in which the natural drying oil is soya bean oil.

5. Composition according to claim 1 in which the natural drying oil is tall oil.

6. In a method for preparing latex paint primer containing polyacrylic, polystyrene-acrylic or polyvinyl acetate latex emulsion said emulsion containing from 45 to 60% solids, the amount of said polymeric latex emulsion employed in said latex paint being from 20 to 30%, the improvement which comprises adding to said latex paint primer from 5 to 10% of a natural drying oil selected from the group consisting of tung, linseed, safflower, soya bean, peanut and tall oil and from 5% to 15% a basic zinc phosphite having the formula $xZnO.ZnHPO_3$ where $x$ is a number from ½ to 10, thereby forming a paint primer which when used on a metal surface prevents flash rusting, all of the percentages expressed on a weight basis.

* * * * *